United States Patent [19]
Hofmann et al.

[11] 3,947,102
[45] Mar. 30, 1976

[54] APPARATUS FOR RETRIEVING MICROIMAGES

[75] Inventors: Wilfried Hofmann, Taufkirchen; Horst Bickl, Munich; Walter Gutmann, Lochhofen, all of Germany

[73] Assignee: AGFA-Gevaert, Leverkusen, Germany

[22] Filed: Oct. 15, 1974

[21] Appl. No.: 515,006

[30] Foreign Application Priority Data
Oct. 13, 1973  Germany............................ 2351580

[52] U.S. Cl.............................. 353/27 A; 353/101
[51] Int. Cl.².......................................... G03B 23/08
[58] Field of Search..... 353/25, 26, 26 A, 27, 27 A, 353/88, 91, 97, 101

[56] References Cited
UNITED STATES PATENTS

| | | | |
|---|---|---|---|
| 1,889,575 | 11/1932 | Sebille | 353/26 |
| 1,918,468 | 7/1933 | Harding | 353/26 |
| 3,195,405 | 7/1965 | Clark | 353/97 |
| 3,294,472 | 12/1966 | Harper | 353/97 |
| 3,692,409 | 9/1972 | Weber | 353/26 |
| 3,751,152 | 8/1973 | Rinehart | 353/17 |
| 3,753,480 | 8/1973 | Okamo | 353/27 |

*Primary Examiner*—Richard E. Aegerter
*Assistant Examiner*—A. Jason Mirabito
*Attorney, Agent, or Firm*—Michael J. Striker

[57] ABSTRACT

Apparatus for retrieving images of microfilms on sheet-like microforms on which the microfilms form frames arranged in vertical and horizontal rows and including larger and smaller frames. A transporting unit can move a microform up or down in a vertical plane so as to place a selected horizontal row of frames in front of a horizontal light source. A carriage in front of the transporting unit supports two lenses which are in line with the light source and respectively serve to project the images of larger and smaller frames onto the screen of a television camera. The carriage is movable horizontally to place a selected lens into register with a selected frame of that horizontal row of frames which is located in front of the light source, and the carriage can transmit motion to a plate- or belt-like diaphragm which is disposed between the transporting unit and the lenses and has one or more apertures registering with that lens which projects the image of a selected frame onto the screen. The device for moving the carriage includes a steel band connected to the carriage and having encoded information which is scanned by one of two photoelectric detectors. These detectors are actuatable alternatively and are respectively associated with the lenses for the projection of images of larger and smaller microfilm frames to arrest the motor for the band when the corresponding lens registers with a selected frame.

13 Claims, 2 Drawing Figures

APPARATUS FOR RETRIEVING MICROIMAGES

BACKGROUND OF THE INVENTION

The present invention relates to microfilm reading or microimage retrieving apparatus in general, and more particularly to improvements in apparatus for projecting and enlarging the images of selected frames which form rows of frames on sheet- or panel-like microforms or microsheets.

It is already known to provide an apparatus for retrieving images of microfilm frames, which form rows of frames on a microform, with a conveyor system serving to move a microform into and thereupon in a predetermined plane until the selected frame reaches a projection position in which its image is enlarged and projected onto a screen by a suitable optical system and a light source. A drawback of such apparatus is that the placing of a selected frame (the frames are normally arranged in vertical and horizontal rows) into the projection position takes up a substantial amount of time and that the conveyer system is bulky, complex and expensive.

SUMMARY OF THE INVENTION

An object of the invention is to provide a microimage retrieving apparatus wherein the projection lens or one of several projection lenses can be placed into register with a selected microfilm frame of an array of microfilm frames on a card- or sheet-like microform with little loss in time.

Another object of the invention is to provide the apparatus with novel and improved means for transporting microforms of the type wherein the microfilm frames form parallel first rows of frames and parallel second rows of frames which are inclined with respect (and preferably normal) to the first rows of frames.

A further object of the invention is to provide the apparatus with a novel and improved projection system which may include one or more lenses and a diaphragm.

An additional object of the invention is to provide a novel and improved diaphragm for use in the above outlined projection system.

Still another object of the invention is to provide the apparatus with novel and improved means for automatically arresting a selected lens in a position of register with a selected microfilm frame on a microform which has been inserted or fed into the transporting unit.

The invention is embodied in an apparatus for projecting the images of selected microfilm frames on sheet-like or panel-like microforms wherein the frames form a plurality of discrete parallel rows (preferably a plurality of first and second rows whereby the first rows are inclined with respect to and preferably normal to the second rows). The apparatus comprises means for transporting a microform in a first direction extending at right angles to the discrete parallel rows of microfilm frames on a microform which has been inserted or fed into the transporting means whereby the latter can move a selected discrete row into a predetermined projection position (e.g., in front of an elongated light source), and a projection system having lens means in line with the projection position and means for moving the lens means in parallelism with the discrete rows of frames on a microform in the transporting means so that the lens means is movable into register with a selected frame in the discrete row which occupies the projection position.

For example, the transporting means may include rollers or analogous microform-engaging elements which can move the microform up or down in parallelism with the vertical rows of microfilm frames on such microform, and the means for moving the lens means may comprise a carriage which is movable along a horizontal path in front of the transporting means (i.e., in parallelism with the hosizontal rows of microfilm frames on the microform in a transporting means) and which supports one or more discrete projection lenses, e.g., a lens for the projection and enlargement of images of larger frames and a lens for the projection and enlargement of images of smaller frames.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
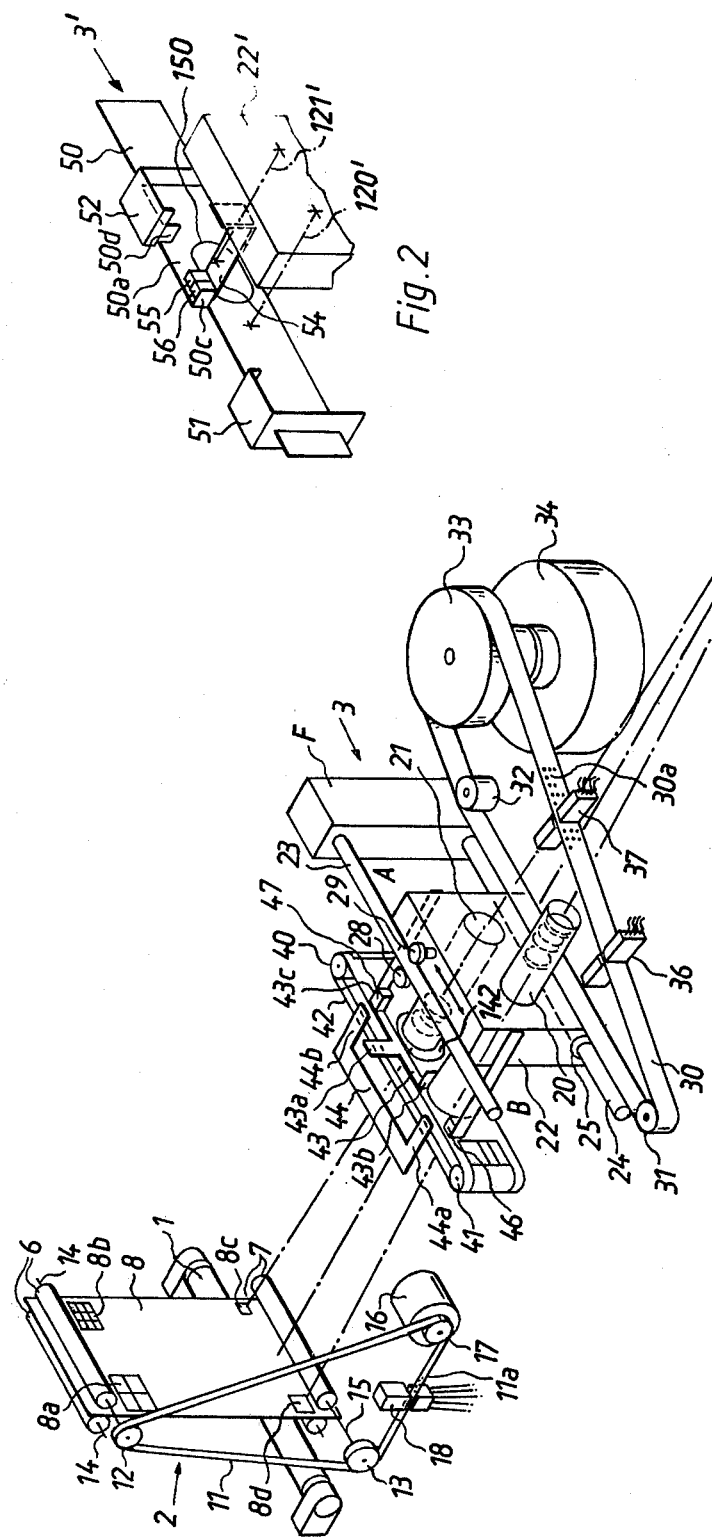
FIG. 1 is a schematic perspective view of a microimage retrieving apparatus which embodies one form of the invention.

The microimage retrieving apparatus of FIG. 1 comprises a light source 1 here shown as a horizontal fluorescent tube which is located behind a vertical path wherein a microform or microsheet 8 is movable up and down by a transporting unit 2. The apparatus further comprises a movable projection system 3 which is located in front of the aforementioned path and an image receiving unit 4, e.g., a television camera.

The transporting unit 2 comprises an upper or first pair of horizontal microform-engaging rollers 6 mounted in the frame or housing of the apparatus at a level above the light source 1, and a second or lower pair of horizontal microform-engaging rollers 7 which are located at a level below the light source. The illustrated microform 8 is assumed to have several microfilm frames which form several horizontal and vertical rows and include larger frames 8a, 8d and smaller frames 8b, 8c. At least one roller of each pair of rollers 6 and 7 is driven by an endless belt conveyor 11 which is trained over pulleys 12, 13 and 17. The pulley 12 rotates the shaft 14 of the right-hand roller 6, the pulley 13 rotates the shaft 15 of the right-hand roller 7, and the pulley 17 is driven by the output element of a prime mover 16, e.g., an electric motor. At least a portion of the belt conveyor 11 is provided with encoded information (shown at 11a) which is monitored by a photoelectric detector 18 of known design. This detector controls the circuit of the motor 16 and insures that the motor is brought to a standstill when a selected horizontal row of microfilm frames 8a, 8b, 8c or 8d is located in a projection position, i.e., in front of the light source 1.

The projection system 3 is disposed in the path of light issuing from the source 1 and travelling toward the screen of the camera 4. This projection system comprises two projection lenses 20, 21 which respectively correspond to the format of the frames 8a, 8d and 8b, 8c and which are mounted in a carriage 22. The optical axes of the lenses 20, 21 are parallel to each other and the carriage 22 is movable along a horizontal path at right angles to such optical axes. The guide means for the carriage 22 comprises two horizontal tie rods 23, 24 which are mounted in a portion F of the housing. The lower portion of the carriage 22 contains one or more sleeves 25 with antifriction bearings so as to reduce friction between the carriage and the lower tie rod 24. The upper end face of the carriage 22 supports two upwardly extending posts for antifriction bearings 28, 29 whose outer races engage the tie rod 23. The posts for the bearings 28, 29 are preferably adjustable vertically as well as toward or away from each other.

The device for moving the carriage 22 lengthwise of the tie rods 23, 24 comprises a metallic band or tape 30 (preferably a steel band) which is trained over pulleys 31, 32 and 33. A portion of the band 30 between the pulleys 31, 32 is secured to the adjacent front side of the carriage 22, and the pulley 33 is driven by a prime mover 34, e.g., a reversible D.C. motor. The latter cooperates with a suitable tachometer generator which indicates the angular position of the pulley 33 and hence the position of the carriage 22 and lenses 20, 21. The apparatus preferably further comprises a suitable braking device (not shown) which brakes the output element of the motor 34 and/or the pulley 33 when the belt 30 is idle to thus reduce the likelihood of vibration of the carriage 22 in a selected position with respect to the tie rods 23, 24. The band 30 is formed or provided with encoded information (shown at 30a) which is monitored by a photoelectric detector 36 or 37. The information 30a is indicative of the position of the carriage 22 as well as of the opening or closing of a diaphragm 42 which is associated with the lenses 20 and 21. The detectors 36 and 37 are mounted in the housing of the apparatus and their design is preferably similar to that of detectors used in connection with punched cards or punched tape. The detector 36 scans the encoded information 30a when the image of a frame on a microform 8 is to be projected and enlarged by the lens 20, and the detector 37 is activated when the image of a frame is to be projected and enlarged by the lens 21. The distance between the detectors 36, 37 equals the distance between the lenses 20, 21. The feature that the detector 36 is activated when the detector 37 is deactivated or vice versa renders it possible to simplify the apparatus because the band 30 must be provided with a single set of bits of encoded information 30a.

The aforementioned diaphragm 42 for the lenses 20 and 21 is an endless belt which is trained over vertical pulleys or rollers 40 and 41 and is located in the space between the transporting unit 2 and the carriage 22. The upper portion of the front stretch of the diaphragm 42 is connected with a substantially U-shaped follower 43 whose central portion or web is secured to the diaphragm and whose legs constitute bent-over prongs 43b, 43c extending forwardly toward the carriage 22. The follower 43 further comprises a projection 43a which extends upwardly from its web and is disposed between the spaced-apart legs 44a, 44b of a U-shaped plate-like stop 44 fixed to the housing of the apparatus behind the diaphragm 42. The carriage 22 further supports two fixedly mounted motion-transmitting permanent magnets 46 and 47 which can respectively attract the prongs 43b and 43c of the follower 43 on the front stretch of the diaphragm 42.

The operation is as follows:

A microform 8 which can but need not carry microfilm frames 8a-8d of different sizes is introduced into the transporting unit 2 and the latter is actuated by starting the motor 16 to move the microform 8 up or down and to thus place a selected horizontal row of frames 8a, 8b, 8c or 8d into the projection position in front of the light source 1. In other words, that horizontal row of microfilm frames which contains a selected frame (e.g., a frame 8c) is then disposed in front of and in parallelism with the light source 1. At the same time, the motor 34 moves the band 30 whereby the detector 37 monitors the encoded information 30a and arrests the motor 34 at the exact moment when the lens 21 registers with the selected frame 8c, i.e., when the image of such frame can be projected onto the screen of the camera 4. At the same time, the detector 37 causes an opening of the diaphragm 42, i.e., such movement of the diaphragm that the apertures in its front and rear stretches (see the aperture 142 in the front stretch) allow light to pass from the source 1, through the selected frame 8c, through the apertures, through the lens 21 and to reach the screen of the camera 4.

If the operator thereupon desires to project the image of another frame located in the same row and having the same format as the previously selected frame 8c, the carriage 22 is moved along the tie rods 23, 24 so that the lens 21 registers with the newly selected frame whereby the motion transmitting permanent magnet 47 attracts the prong 43c of the follower 43 and causes the diaphragm 42 to perform a corresponding movement so that its apertures remain in register with the lens 21.

If the operator wishes to project the image of a microfilm frame having a different format (e.g., a frame 8d), the detector 37 is deactivated and the detector 36 is activated from the control panel of the apparatus whereby the carriage 22 automatically moves to its right-hand end position A in which the lens 21 is out of register with all of the corresponding microfilm frames. The permanent magnet 47 can entrain the follower 43c and hence the diaphragm 42 only until the projection 43a reaches and is arrested by the arm 44b of the stop 44 so that the permanent magnet 47 thereupon moves away from the prong 43c and the permanent magnet 46 approaches and attracts the prong 43b as soon as the carriage 22 reaches the end position A. The magnet 46 thereupon establishes a motion transmitting connection between the carriage 22 and the diaphragm 42 until and unless the carriage 22 is moved to the other end position B (in response to renewed activation of the detector 37); this causes the magnet 46 to move away from the prong 43b and the magnet 47 to attract the prong 43c. The lens 20 projects the images of frames 8a, 8d and is moved into register with a selected frame 8a or 8d in response to a signal from the detector 36 which is then active and monitors the information 30a on the band 30.

The manner in which the detector 18 receives signals from the control panel to start the motor 16 and to arrest the motor when a selected frame 8a, 8b, 8c or 8d reaches the projection position is known in the art. This also applies for the manner in which the detector 36 or 37 arrests the motor 34 when the lens 20 or 21 registers with a selected frame of that row which is in line with the lenses, i.e., in front of the light source 1.

Figure 2:
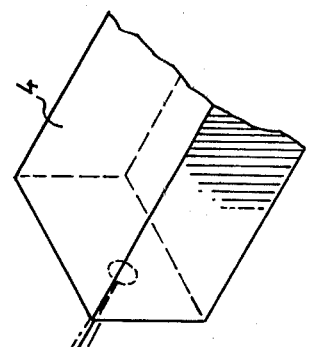
FIG. 2 is a perspective view of a portion of a modified apparatus.

FIG. 2 shows a portion of a modified microimage retrieving apparatus which comprises a movable projection system 3' having a greatly simplified diaphragm. Thus, the endless belt-like diaphragm 42 of FIG. 1 is replaced with a simple plate-like diaphragm 50 which is reciprocable in fixed guide means 51, 52 mounted in the housing of the apparatus. The upper portion of the diaphragm 50 has an extension or follower 50a with two forwardly bent portions or prongs 50c, 50d corresponding to the prongs 43b, 43c of the follower 43. The carriage 22' of the apparatus of FIG. 2 has a rearwardly extending motion transmitting support or bracket 54 for two permanent magnets 55, 56 which are disposed in the space between the prongs 50c, 50d. The prong 50c is attracted by the permanent magnet 56 when the carriage 22' reaches its left-hand end position (corresponding to the end position B of the carriage 22 shown in FIG. 1) and the prong 50d is attracted by the permanent magnet 55 when the carriage 22' reaches its right-hand end position. When the prong 50c or 50d is attracted by the respective magnet 56, 55, the plate-like diaphragm 50 remains coupled to the carriage 22' until and unless the carriage 22' is caused (in response to activation of the detector 36 or 37, not shown in FIG. 2) to move to one of its end positions and to thus automatically couple its bracket 54 to the diaphragm 50 in such a way that the aperture 150 of the diaphragm registers with the corresponding lens (the optical axes of the lenses on the carriage 22' are indicated at 120', 121').

An important advantage of the movable projection system 3 or 3' is that the apparatus can be equipped with a simplified transporting unit for microforms. Thus, the transporting unit 2 merely serves to move a microform at right angles (vertically, as viewed in FIG. 1) to the horizontal rows of microfilm frames 8a, 8b, 8c or 8d on a microform which is inserted into the transporting unit so as to locate a selected horizontal row in the projection position in front of the light source 1, and the carriage 22 or 22' is simultaneously caused to move the lenses in parallelism with the horizontal rows of frames so as to place a selected lens into register with a selected microfilm frame of that horizontal row of frames which is located in the projection position. In other words, the improved apparatus divides the movements which are needed to place a selected lens into register with a selected microfilm frame into a first set of movements which are performed by a microform 8 in response to controlled movement of the transporting unit 2 and a second set of movements which are performed simultaneously with first movements by the lens or lenses on the carriage 22 or 22' so as to move a lens into register with a selected frame of the horizontal row of frames in front of the light source 1 whereby the device 30-34 which moves the carriage 22 or 22' is automatically arrested by the detector 36 or 37 when the activated detector spots the corresponding bit of information 30a on the band 30. Such mode of operation greatly reduces the length of intervals which are required to place the lens 20 or 21 into register with a selected microfilm frame.

It is clear that the improved apparatus is susceptible of many additional modifications. For example, the projection system may comprise a single lens or three or more discrete lenses (and an equal number of detectors adjacent to the path of movement of the band 30). Also, the transporting unit can be designed to move a microform horizontally and the means for moving one or more lenses then comprises a device which can move the carriage 22 or 22' vertically. Still further, the apparatus can be provided with a more sophisticated diaphragm and with a discrete mechanism (which can receive motion from the motor 34 or from a separate motor) for moving the diaphragm in response to movement of the carriage 22 or 22'.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an apparatus for projecting the images of selected microfilm frames on sheet-like microforms wherein the frames form a plurality of rows, a combination comprising means for transporting a microform in a direction at right angles to the rows of frames on said microform which is introduced into said transporting means whereby the latter can place a selected row of frames into a predetermined projection position, said transporting means comprising driven microform engaging elements, a belt movable to drive said elements and having encoded information thereon for identifying rows of frames on a microform, a motor for moving said belt, and detector means operatively connected with said motor and positioned to scan said information on said belt so as to effect the stoppage of said belt and of the microform in said transporting means when a selected row of frames reaches said projection position; and a projection system having lens means in line with said projection position, and means for moving said lens means in parallelism with the rows of frames on a microform in said transporting means, said lens means being movable into register with a selected frame in the row of frames occupying said projection position, said moving means comprising a band having a portion operatively connected with said lens means, a second motor for moving said band, and means for arresting said second motor when said lens means registers with a selected frame of the row occupying said projection position, said arresting means comprising information encoded on said band and identifying selected frames of a row of frames on a microform in said transporting means and additional detector means adjacent the path of movement of said band and operatively connected with said second motor to arrest the latter in response to detection of information identifying a selected frame of the row of frames occupying said projection position.

2. A combination as defined in claim 1, wherein said band is a metallic band.

3. A combination as defined in claim 1, wherein said additional detector means comprises at least one photoelectric detector.

4. A combination as defined in claim 1, wherein said lens means comprises a plurality of discrete lenses and said additional detector means comprises a plurality of photoelectric detectors, one for each of said discrete lenses.

5. A combination as defined in claim 4, wherein said projection system further comprises diaphragm means having at least one aperture and means for moving said diaphragm means in response to movement of said lens means to thereby move said aperture into register with that discrete lens which is in register with a selected frame of the row of frames in said projection position.

6. A combination as defined in claim 4, wherein said lenses include first and second lenses spaced apart from each other by a predetermined first distance and the corresponding detectors are spaced apart from each other by an identical second distance.

7. A combination as defined in claim 6, wherein said detectors are actuatable independently of each other to thereby effect the movement of the corresponding lens into register with a selected frame of the row of frames in said projection position.

8. A combination as defined in claim 1, wherein said microform engaging elements are arranged to move a microform vertically and said moving means further comprises a carriage for moving said lens means along a horizontal path.

9. A combination as defined in claim 1, wherein said projection system further comprises a diaphragm having at least one aperture and means for moving said diaphragm so as to place said aperture between said lens means and a selected frame in the row of frames at said projection position.

10. A combination as defined in claim 9, wherein said diaphragm is an endless flexible element.

11. A combination as defined in claim 9, wherein said diaphragm is a reciprocable plate.

12. A combination as defined in claim 9, wherein said means for moving said diaphragm comprises motion transmitting means provided on said carriage and follower means provided on said diaphragm and located in the path of movement of said motion transmitting means.

13. A combination as defined in claim 12, wherein said motion transmitting means includes at least one permanent magnet on said carriage.

* * * * *